US006757838B1

(12) United States Patent
Chaiken et al.

(10) Patent No.: US 6,757,838 B1
(45) Date of Patent: Jun. 29, 2004

(54) HARDWARE INDEPENDENT IMPLEMENTATION OF COMPUTER SYSTEM BIOS RECOVERY

(75) Inventors: Craig L. Chaiken, Tomball, TX (US); Edmund Heller, Spring, TX (US); Stanley Stanart, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 401 days.

(21) Appl. No.: 09/687,006

(22) Filed: Oct. 13, 2000

(51) Int. Cl.⁷ .............................................. G06F 11/00
(52) U.S. Cl. ...................... 714/5; 714/6; 714/7; 714/15
(58) Field of Search .............................. 714/5, 6, 7, 15

(56) References Cited

U.S. PATENT DOCUMENTS

| | | | |
|---|---|---|---|
| 5,019,970 A | | 5/1991 | Yamaguchi et al. |
| 5,195,130 A | | 3/1993 | Weiss et al. |
| 5,303,171 A | | 4/1994 | Belt et al. |
| 5,327,531 A | * | 7/1994 | Bealkowski et al. ............ 714/6 |
| 5,355,489 A | | 10/1994 | Bealkowski et al. |
| 5,388,267 A | | 2/1995 | Chan et al. |
| 5,440,632 A | | 8/1995 | Bacon et al. |
| 5,471,674 A | | 11/1995 | Stewart et al. |
| 5,708,776 A | * | 1/1998 | Kikinis ......................... 714/55 |
| 5,793,943 A | * | 8/1998 | Noll ............................... 714/6 |
| 5,915,080 A | * | 6/1999 | Park ............................... 714/6 |
| 5,960,445 A | * | 9/1999 | Tamori et al. .............. 707/203 |
| 6,018,806 A | * | 1/2000 | Cortopassi et al. ............ 714/8 |
| 6,038,663 A | * | 3/2000 | Feldman ......................... 713/1 |
| 6,173,417 B1 | * | 1/2001 | Merrill ......................... 714/15 |
| 6,240,519 B1 | * | 5/2001 | James et al. ................. 713/202 |
| 6,272,626 B1 | * | 8/2001 | Cobbett ......................... 713/2 |
| 6,308,265 B1 | * | 10/2001 | Miller ............................ 713/2 |
| 6,336,161 B1 | * | 1/2002 | Watts ......................... 711/103 |
| 6,412,082 B1 | * | 6/2002 | Matsuura ...................... 714/38 |
| 6,442,623 B1 | * | 8/2002 | Kim .............................. 710/8 |
| 6,535,992 B1 | * | 3/2003 | Cheng ........................... 714/5 |
| 6,571,347 B1 | * | 5/2003 | Tseng ............................ 714/6 |

OTHER PUBLICATIONS

*MC68000 Educational Computer Board User's Manual*, Second Edition, Pub. Motorola, Inc., (Jul. 1982).

(List continued on next page.)

*Primary Examiner*—Nadeem Iqbal
*Assistant Examiner*—Timothy M Bonura

(57) ABSTRACT

Either a backup BIOS or a main BIOS in a non-volatile memory is used to fully boot a computer system, depending on the validity of the main BIOS, successful prior booting using the main BIOS, or the validity of the CMOS settings. Unlike the boot block procedure, in either case, the computer system becomes fully operational. A count is made indicating the number of times booting is retried with the main BIOS. If a predetermined count value is reached, the main BIOS is invalid, or CMOS is invalid, then booting is completed using the backup BIOS. If the predetermined count value is not reached, a jump is made from the end of the BIOS validation code to an entry point in the main BIOS of the non-volatile memory to continue booting using the main BIOS. The backup BIOS is stored in a permanent protected portion of the non-volatile memory and the main BIOS is stored in a flashable portion of the non-volatile memory. The number of contiguous or non-contiguous blocks of the non-volatile memory used to store the backup BIOS and the main BIOS will depend on the specific architecture of the non-volatile memory. In one embodiment, the backup BIOS and the main BIOS are stored each in single contiguous blocks of the non-volatile memory. Alternatively, in other embodiments, the backup BIOS and the main BIOS are stored each in a plurality of individually contiguous or non-contiguous blocks of the non-volatile memory.

36 Claims, 3 Drawing Sheets

OTHER PUBLICATIONS

Axelson, Jan, *How To Use Flash EMPROMs in Your Own Circuits,* magazine, Computer Craft Magazine, (Mar. 1993), pp. 32–39.

*28F010 1024K (128K ×8) CMOS Flash Memory,* Intel Corporation, (Nov. 1992), pp. 3–54–3–83.

*28F001BX–T/28F001BX–B 1M (128K ×8) CMOS Flash Memory,* Intel Corporation, (Sep. 1992), pp. 3–117–3–145.

*Toshiba Mos Memory Products, TC541000P/F–20, –25, TC541001P/F–20, –25,* Toshiba MOS Memory Products Data Book, (2/89), pp. K–59–K–71.

\* cited by examiner

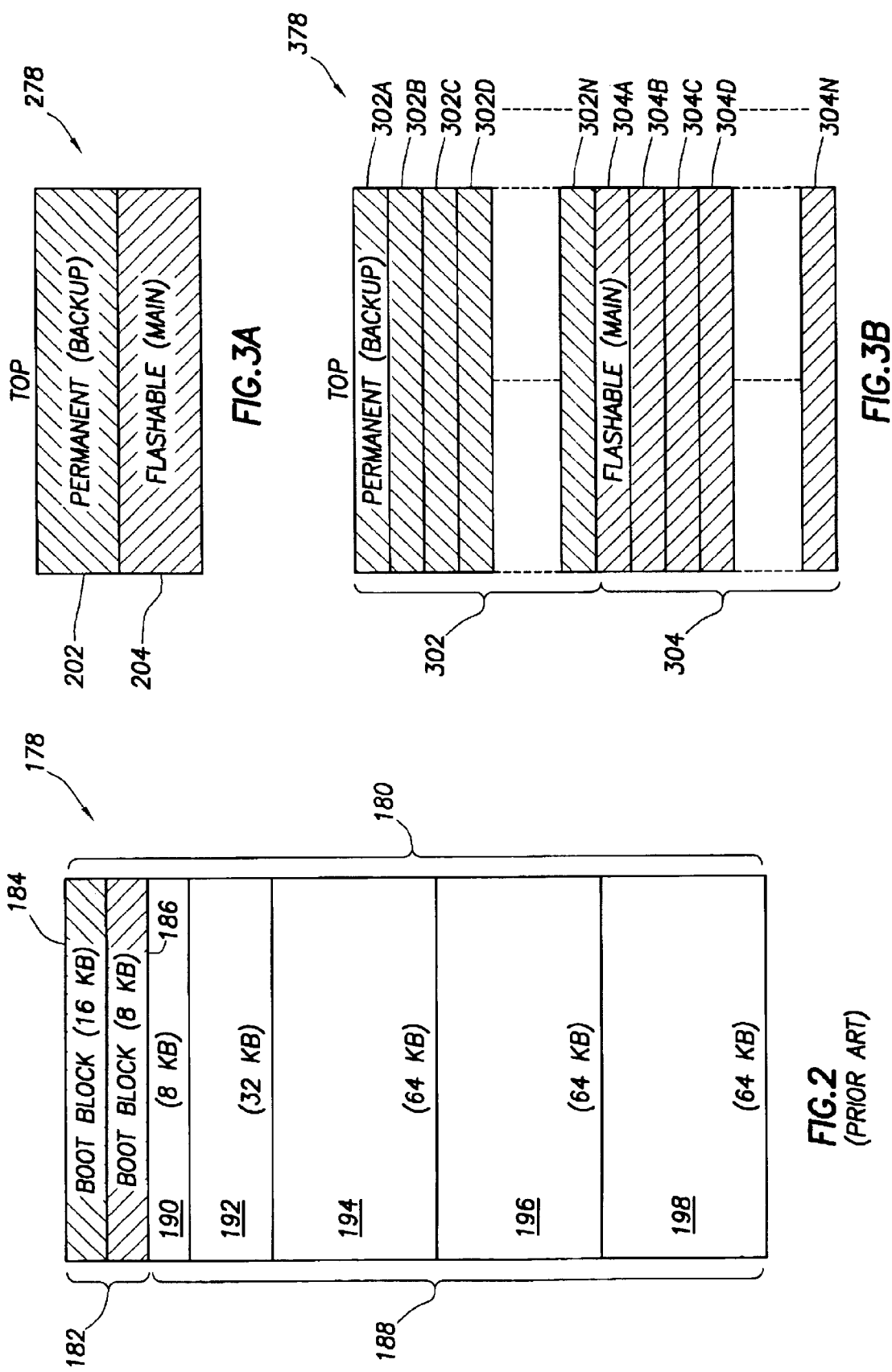

HARDWARE INDEPENDENT IMPLEMENTATION OF COMPUTER SYSTEM BIOS RECOVERY

BACKGROUND OF THE INVENTION

1. Field of the Invention

The present invention is related to a computer system's basic input output system (BIOS), and more particularly, a mechanism to detect and accommodate an invalid BIOS image that allows the computer system to be fully operational until a valid BIOS image can be obtained.

2. Description of the Related Art

The typical computer system contains embedded low-level BIOS code used to initialize the computer system. The BIOS also includes code that interfaces between the operating system and the specific hardware configuration, allowing the same operating system to be used with different hardware configurations. Flash ROM (Read-Only Memory) previously has been used to store the BIOS. Flash ROM is an inherently non-volatile memory that allows for in-system updateability. Updating occurs by "flashing" or writing a new ROM image onto the chip while the system is operational, from a variety of possible sources, including removable media devices, modem links, or parallel or serial connectors.

Typical BIOS functions include the initialization of disk drives, including floppy, hard, and CD-ROM, and initialization of the video and graphical interfaces. The BIOS is specifically configured for each computer system based on the presence of specific hardware and the current hardware version or manufacturer. If the computer system hardware is updated or modified, the BIOS may need to be updated or upgraded to properly initialize the new hardware. The user can flash the updated or upgraded BIOS to the Flash ROM after the user has replaced or upgraded a component of the computer system.

A potential problem exists, however, when an updated BIOS is flashed. An incorrect BIOS could be flashed inadvertently or the flash interrupted, resulting in corrupted data in the Flash ROM. A computer virus possibly could infect an updated or upgraded BIOS as well. Corrupted data in the Flash ROM would not allow the system to initialize properly. To prevent this, the Flash ROM memory array previously has been divided into two distinct sections, a boot block and a main block. The boot block is a small BIOS residing in an unprogrammable (i.e., a hardware blocked) sector (also referred to as segment) in the Flash ROM part and contains only enough functionality to allow the main ROM to be reprogrammed from, for example, a floppy disk image. Although the boot block typically contains minimal initialization routines for a floppy disk drive and a keyboard, it does not contain routines for a video interface because of the size of such code and its non-standard nature. The boot block of the Flash ROM is protected from an ordinary flash, and the data stored in the boot block will remain even after a corrupted ROM image is flashed. The previously discussed initialization routines all reside in the main block of the Flash ROM.

The boot block can be used to store the kernel code necessary to initialize the basic components of the system even if a corrupted ROM image is present. The boot block may be code merely sufficient to allow the corrupted ROM to be reflashed. Typically, the standard ROM voltage levels, such as 3–5 volts, necessary to perform an in-system ROM flash cannot alter the boot block code. Instead, higher voltage levels, such as 12 volts, or moving a jumper in circuitry associated with the Flash ROM, usually are required, as will be appreciated by those skilled in the art. Therefore, even if the Flash ROM is incorrectly flashed or the flashed main ROM is corrupted, because of the code present in the boot block, the system still will initialize enough to allow the user to flash the correct main ROM image to the Flash ROM, using a variety of techniques.

The boot block configuration outlined above allows recovery after a power loss during flashing, or loading of an invalid or corrupted BIOS image. The boot block requires the development of unique BIOS code for the purpose of allowing the main ROM to be reflashed via removable media (or medium), such as a floppy disk. Generally, a computer system that is booting from the boot block loads the operating system from the removable media. The computer system, however, does not have to be in boot block recovery to boot from removable media. A computer system can be configured to boot from removable media when the removable media is present, regardless of whether the computer system is in boot block recovery.

While much of the code for boot block support may be simply copied from the main BIOS code, considerable new hardware dependent code must be developed for each new product. Additionally, the boot block BIOS depends on the availability of a BIOS flash removable media; if the removable medium is not available, the computer is not sufficiently functional to obtain the BIOS image by other means, such as downloading via modem.

Further, because a computer's system BIOS can be flashed or reflashed outside the factory, there is a need for a more robust recovery mechanism when the flash part is corrupted due to flashing an invalid BIOS, or when the flash process is interrupted before it completes, whether or not removable media are present. Every time a computer's system BIOS is flashed, the computer system can be rendered irrecoverably unbootable, either due to power loss during the flashing process, or loading an invalid or corrupted BIOS image.

SUMMARY OF THE INVENTION

According to embodiments of the invention, a computer system features support of a permanent (backup) and a main BIOS in a non-volatile memory, such as a flashable ROM. The computer system is fully initialized and made fully operational using either the backup BIOS or the main BIOS. Which BIOS is used depends on the validity of the main BIOS, or whether booting is successful using the main BIOS. During power-up, the computer system determines if a non-volatile memory is invalid or corrupt, or if a predetermined number of reboot tries has occurred in attempting to use the main BIOS. A count is made of the number of times booting is retried with the main BIOS. If a predetermined count value is reached, or if the main BIOS is invalid, then only the backup BIOS is used to complete booting. If, however, the predetermined count value is not reached, booting continues using the main BIOS.

The non-volatile memory includes a permanent protected portion and a writeable or flashable portion. The backup BIOS is stored in the permanent protected portion of the nonvolatile memory and the main BIOS is stored in the writeable portion of the non-volatile memory. The permanent protected portion is protected by the design of the backup BIOS code itself, independent of any hardware protection, such as blockable sectors. The backup BIOS code is written so as not to allow overwriting, flashing, or otherwise altering the permanent protected portion. However, hardware protection is not precluded in some embodiments of the present invention and can be used in addition to the software-based protection.

The number of contiguous or non-contiguous blocks of the non-volatile memory used to store the backup BIOS and the main BIOS depends on the specific architecture of the non-volatile memory. In one embodiment, the backup BIOS and the main BIOS are stored each in single contiguous blocks of the non-volatile memory. In other embodiments, the backup BIOS and the main BIOS are stored each in a plurality of individually contiguous or non-contiguous blocks of the non-volatile memory.

In one aspect, embodiments of the invention feature validating the main BIOS using the backup BIOS. If the main BIOS is invalid or unavailable, then only the backup BIOS is executed until the computer system is fully operational. On the other hand, if the main BIOS is valid, then the main BIOS is executed until the computer system is fully operational.

BRIEF DESCRIPTION OF THE DRAWINGS

A better understanding of the present invention can be obtained when the following detailed description of the preferred embodiment is considered in conjunction with the following drawings, in which:

FIG. 2 is a block diagram of prior art sector partitioning of a Flash ROM that includes boot block code used for a limited initialization of hardware components of the computer system in FIG. 1;

FIG. 3A is a block diagram of sector partitioning of a Flash ROM used for complete initialization of the computer system of FIG. 1, in accordance with an embodiment of the invention;

FIG. 3B is a block diagram of another sector partitioning of a Flash ROM used for complete initialization of the computer system of FIG. 1, in accordance with an embodiment of the invention.

DETAILED DESCRIPTION

Figure 1:
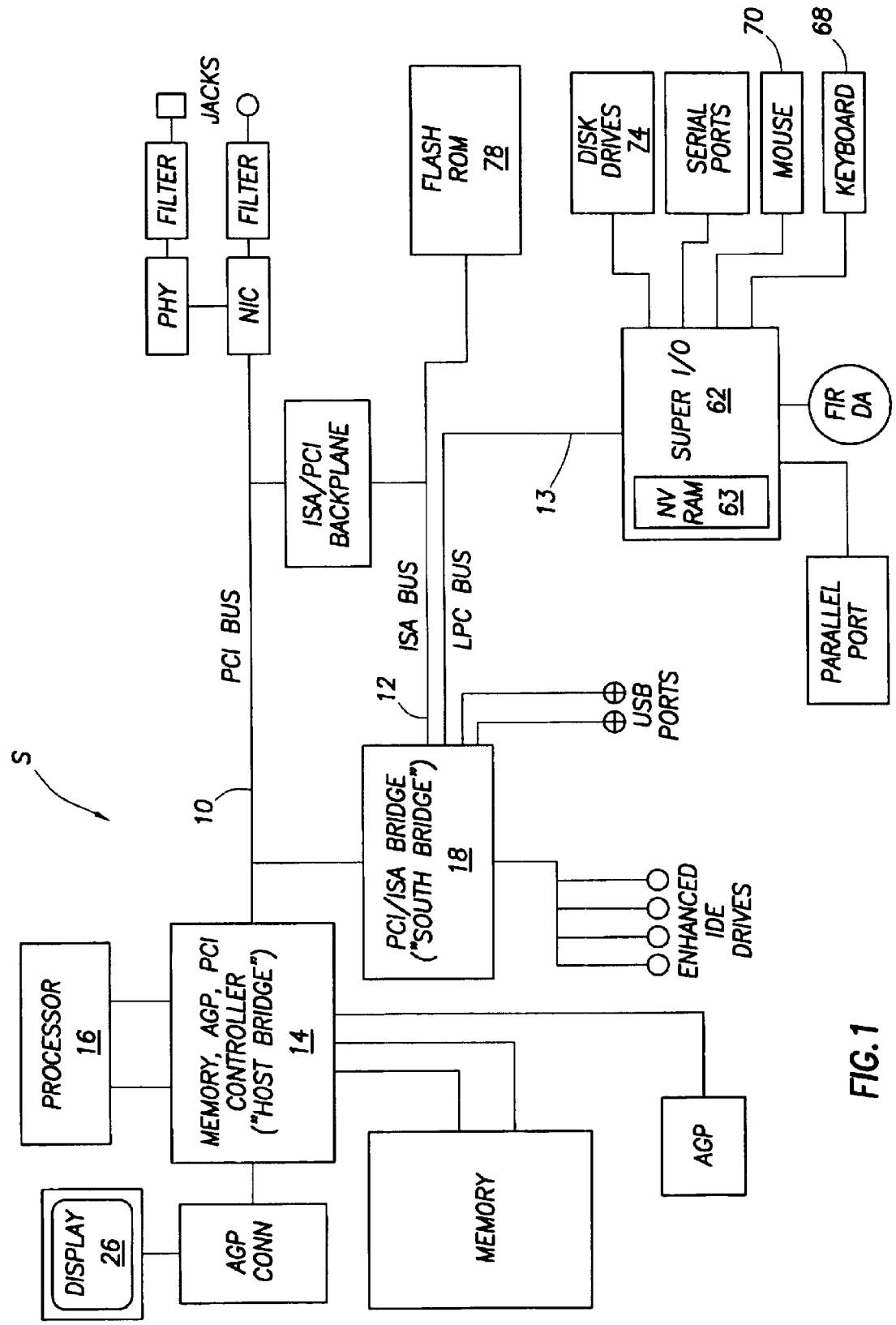
FIG. 1 is a block diagram of the computer system having a Flash ROM in accordance with an embodiment of the invention.

FIG. 1 illustrates a computer system S. The computer system S can be a personal computer (PC) or other type of computer system, in accordance with an embodiment of the invention. While this system is illustrative of one embodiment, the techniques according to the invention can be incorporated in a wide variety of other embodiments. These other embodiments include systems having more or less components than the computer system S, and other systems that use a BIOS, such as personal digital assistants (PDAs), cellular, PCS or other telephones, and the like, and any device with an upgradeable BIOS, as will be appreciated by those skilled in the art. The computer system S in the illustrated embodiment is a peripheral component interface (PCI) bus/industry standard architecture (ISA)/low pin count (LPC) bus-based machine, having a PCI bus 10, an ISA bus 12, and an LPC bus 13. The PCI bus 10 is controlled by PCI controller circuitry located within a memory/accelerated graphics port (AGP)/PCI controller ("Host Bridge") 14 (also known as a PCI AGP Controller or PAC).

The Host Bridge 14 couples the PCI bus 10 to a processor 16 through a host bus and a processor socket (not shown). A second bridge circuit, a PCI/ISA bridge ("South Bridge") 18, bridges the PCI bus 10 to the ISA bus 12 and the LPC bus 13.

A nonlimiting example of the processor 16 is a PENTIUM® III by Intel Corporation. Different processors could be used for the processor 16 having enhanced or less functionality, speed, and/or other features, without detracting from the scope and spirit of the invention, as will be appreciated by those skilled in the art.

The Host Bridge 14 in the disclosed embodiment can be an 810 by Intel Corporation. The South Bridge 18 in the disclosed embodiment can be an ICH, also by Intel Corporation. The Host Bridge 14 and the South Bridge 18 provide capabilities other than bridging between the processor 16 and the PCI bus 10, and the PCI bus 10, the ISA bus 12, and the LPC bus 13, respectively, as will be appreciated by those skilled in the art.

The South Bridge 18 is coupled to a Super I/O chip 62 by the LPC bus 13. The Super I/O chip 62 is, for example, a FDC47U33x™ device by Standard Microsystems Corporation. The LPC bus 13 is similar to the ISA bus 12, but does not provide all the signals of the ISA bus 12. The Super I/0 62 contains several logical devices, one of which is a Real Time Clock (RTC) that includes a non-volatile Random Access Memory (NV RAM) 63. In other embodiments, the RTC is included in the South Bridge 18. The Super I/O chip 62 provides a variety of input/output functions, as will be appreciated by those skilled in the art. For example, these functions include one or more disk drive controllers for disk drives 74. The disk drives 74 are, for example, a floppy disk drive. In the disclosed embodiment, the disk drives 74 are coupled through connectors to the Super I/O 62. The disk drives 74 alternatively could be coupled to a universal serial bus (USB) on the South Bridge 18 (not shown) in the computer system S, as will be appreciated by those skilled in the art. In other embodiments, instead of or in addition to a floppy disk drive, a CD-ROM drive, or the like, or other suitable media drive for media that can contain a flash BIOS, could be included in the system S, as will be appreciated by those skilled in the art. A CD-ROM drive could be coupled to an IDE bus, a USB, or an IEEE 1394 bus (not shown). Hereinafter, reference to the disk drives 74 also references any of this variety of possible media drives in the system S.

The South Bridge 18 is also coupled to a Flash ROM 78 by the ISA bus 12. The Flash ROM 78 includes BIOS code, as discussed further below, for execution by the processor 16, as well as additional code for execution by microcontrollers in a ROM-sharing arrangement.

Again, besides the computer system S, a wide variety and arrangement of other computer systems, PDAs, cellular telephones, and the like, that use a BIOS, having more, less, or different components than the disclosed computer system S, could be implemented with the present invention without detracting from the scope and spirit of the invention, as will be appreciated by those skilled in the art. For example, the Host Bridge 14 or its functionality could be built into the processor 16.

FIG. 2 shows a typical boot block Flash ROM 178 having a prior art sector or segment partitioning structure 180. The Flash ROM 178 could be used for the Flash ROM 78 of FIG. 1 in a prior art configuration. It is instructive to discuss the Flash ROM 178 prior to discussing the Flash ROM of the present invention, which will be described in more detail below. The Flash ROM 178 can be, for example, an N82802AB by Intel Corporation (a firmware hub, easily divided in half), an Am29F002 Flash ROM memory by Advanced Micro Devices (AMD), or the like, as the Flash ROM of the present invention can be as well. The Intel N828U2AB can be used on a South Bridge made by Intel Corporation (e.g., for the South Bridge 18). Via Technologies, Inc. provides a South Bridge that can be used with AMD Flash ROM devices. The sector partitioning structure 180 of the prior art is determined by the sector architecture of the particular Flash ROM 178. The sector partitioning structure 180 in FIG. 2 illustrates a top boot block design architecture. The present invention can also be implemented in a top boot block architecture. Other embodiments of the Flash ROM of the present invention can be implemented in a bottom boot block architecture. The Am29F002 Flash ROM memory (e.g., an AmF002BT Flash ROM) can be implemented in either a top or bottom boot block design configuration, for example.

A boot block sector 182 consists of a first boot block sector 184 of 16 kilobytes and a second boot block sector 186 of 8 kilobytes. The boot block 182 is limited, for example, to this total of 24 kilobytes in the Flash ROM. This memory size is small in comparison to a system block 188, which contains, for example, 232 kilobytes of memory. These remaining 232 kilobytes that form the system block 188, are divided into 5 sectors, 190, 192, 194, 196, and 198. In FIG. 2, the first sector 190 has 8 kilobytes, the second sector 192 has 32 kilobytes, and the remaining three sectors 194, 196, and 198 each have 64 kilobytes each. The code stored in the system block 188 preferably contains flashable BIOS code.

The boot block 182 contains just the portion of the BIOS code necessary to initialize the system minimally when an anomaly during power-up is detected or when the system is forced into boot block recovery, as discussed above. The boot block 182 code typically contains the initialization procedure for only a reduced set of hardware components of the computer system S necessary to perform limited functions. This reduces the size of the code required in the boot block 182, as will be appreciated by those skilled in the art. One limited function necessary to perform during boot block 182 initialization is a flash of the Flash ROM 178. The boot block 182 contains code initializing the hardware components necessary to flash the Flash ROM 178.

The code contained within the boot block 182 is permanent and protected from spurious initialization. The system block 188 is electronically protected, but the computer system S of FIG. 1 is at least physically capable of disabling that protection and overwriting the system block 188. The disabling and overwriting process is the flash operation. During a flash, the system block 188 sectors are rewritten with a new flash ROM image.

During the initial power-up (power-on self-test) or reset (i.e., a "cold" or "warm" boot), the computer system S can be forced to boot from the boot block 182 code. This can be done, for example, by pressing and holding down a "hot" key, such as "F10" or "escape", of a keyboard (e.g., keyboard 68 in FIG. 1), prior to power-up and during the initialization period. If the hot key signal is detected, the processor 16 executes BIOS code in the boot block 182 and proceeds as if a corrupted Flash ROM 178 is detected, as will be appreciated by those skilled in the art. Further description of boot block procedures and BIOS are provided in U.S. patent application Ser. No. 08/044,241, filed Apr. 7, 1993, now U.S. Pat. No. 6,182,187, which is assigned to the same assignee as the present invention, and is hereby incorporated by reference herein in its entirety.

The typical prior art boot block 182 procedure is described in more detail as follows. During power-up and initialization of the system S, the processor 16 executes the boot block 182 code and the system block 188 code contained in the Flash ROM 178. Using the boot block 182 procedure, the processor 16 first runs and checks status using a built-in self-test (BIST). The processor 16 then initializes the Host Bridge 14 and the South Bridge 18 followed by the Super 62. If the self-test is successful, the processor 16 verifies the system block Flash ROM 178 image, and determines whether the Flash ROM 178 is corrupted. If not corrupted, then the processor 16 executes the system block 188 code to fully initialize the computer system S. However, if the Flash ROM 178 image is corrupted, then the processor 16 continues to execute the boot block 182 code to allow only basic initialization, which does not allow the computer system to be fully operational. In so doing, the processor 16 initializes an input device (e.g., the keyboard 68 in FIG. 1), an output device (e.g., LEDs on the keyboard 68), and the disk drives 74 (e.g., a floppy disk drive). Other input devices, such as a mouse 70 (FIG. 1), similarly could be initialized and used. After initialization of the disk drives 74, the processor 16 allows the Flash ROM 178 to be flashed from removable media in the disk drives 74, which contains the program to reflash, and booting occurs.

Techniques for flashing the flash ROM 178 are well known. The Flash ROM program flashing code can reside on the removable media, as discussed above, and can be produced by the manufacturer to flash the flash ROM 178. Alternatively, the ROM program flashing code can be stored in the boot block 182 itself and the new Flash ROM 178 image can be downloaded via a serial or parallel port. Typically, once the flash ROM 178 is unlocked, the removable media is used for booting. The removable media, besides containing the minimal code necessary to flash the Flash ROM 178, usually contains an executable file, which is automatically executed when booting the computer system S. The processor 16 executes the file, flashing a new ROM image to the flash ROM 178. If the flash fails, then a predetermined prompt for flash failure is displayed to the user, for example, using keyboard LEDs. If the flash does not fail, then a predetermined prompt for flash complete is displayed instead.

Unlike the prior art boot block procedure and configuration of FIG. 2 discussed above, according to the present invention, a hardware independent computer system BIOS recovery is implemented. For the present invention, if necessary, a permanent system BIOS is used to boot the computer system S, which finishes the power-on self-test (POST) and, on completion of the booting process, provides full as opposed to limited initialization and functionality, even when a flashable BIOS is unavailable. For this embodiment, no additional hardware dependent code need be developed for each product. FIG. 3A shows such an embodiment as part of a Flash ROM 278 that can be implemented as the Flash ROM 78 in FIG. 1. The Flash ROM 278 consists of a protected permanent system BIOS in block 202 and a flashable system BIOS in block 204, in contrast to the prior art boot and system blocks. The permanent system BIOS in the disclosed embodiment in FIG. 3A is a permanent full or complete "backup" system BIOS unlike the boot block, and resides in one or more sectors that are unaffected by the erasure or programming of the sectors used by the flashable system BIOS. On the other hand, the flashable system BIOS code in block 204 is a "main" system BIOS code that resides in one or more sectors of the Flash ROM 278 that are affected by flash erasure or programming.

The backup copy in the contiguous block 202 is in the upper half (i.e., at higher physical addresses) of the Flash ROM part 278 while the main copy resides in the contiguous block 204 in the lower half (i.e., at lower physical addresses) of the Flash ROM part 278 below the backup BIOS. The backup BIOS uses at least 16 bytes of physical address space of the Flash ROM 278, and the blocks 202 and 204 are each contiguous blocks of ROM storage in the disclosed embodiment. The backup BIOS could use more than 16 bytes of physical address space in other embodiments.

The backup BIOS always gains control of the computer system S upon power up. The backup BIOS in block 202 determines if the main BIOS in block 204 in the Flash ROM 278 has become corrupt during initial power-up and execution of the backup BIOS code. During the booting process, when an invalid, corrupted, or unbootable flashable main system BIOS is detected, control will remain with the permanent backup BIOS code in block 202. On the other hand, if a valid flashable main system BIOS is detected, control will transfer to the main BIOS. At manufacturing time, the permanent BIOS and the main BIOS will generally be identical. If not corrupted or otherwise invalid, the main BIOS of the block 204 is generally an updated or upgraded version of the backup BIOS of the block 202. So, over time, as updates or upgrades are loaded, they will differ.

In certain other embodiments, no main BIOS is loaded at manufacturing time. In other words, at manufacturing time or before the first flashing of the BIOS in these embodiments, the main BIOS need not be populated, but the backup BIOS exists. In these embodiments, the main BIOS is created once the system is flashed. This is in contrast to the boot block Flash ROM architecture of FIG. 2 in which the boot block 182 is the reduced sized code necessary only to initialize minimal hardware components to start the boot block recovery procedure described above. Unlike the architecture of FIG. 2, the backup BIOS of FIG. 3A, as a full or complete BIOS code, according to the invention, is capable of initializing and maintaining the computer system S of FIG. 1 in the fully operational mode. Thus, full operation of the computer system S can be had even without an updated or corrected main BIOS being available.

FIG. 3B shows another part of a Flash ROM 378 that could be used for the Flash ROM 78 in FIG. 1, in accordance with an embodiment of the invention. The backup and flashable main copies of the BIOS in the Flash ROM 378 are completely analogous to those in the Flash ROM 278 except for their storage architecture. In FIG. 3B, unlike in FIG. 3A, the backup and the flashable main copies of the full BIOS are stored in a distributed manner across individual contiguous blocks of memory sectors of the Flash ROM 378. Thus, FIG. 3B shows the backup BIOS code spread out among blocks 302A–302N and the main BIOS among blocks 304A-304N. As will be appreciated by those skilled in the art, the number and sequence of blocks used to store the backup and the main copies of the BIOS, according to the invention, will depend on the specific architecture of a Flash ROM. The embodiments shown in FIGS. 3A and 3B are merely illustrative. A variety of other architectural configurations of Flash ROM, constituting other possible embodiments, some having more or less numbers of contiguous blocks, or even sequences of non-contiguous blocks, could instead be used for storing the copies of the backup and main BIOS. Thus, the techniques according to the invention can be implemented in a variety of embodiments of non-volatile memory. These embodiments also are included within the scope and spirit of the present invention.

Figure 4:
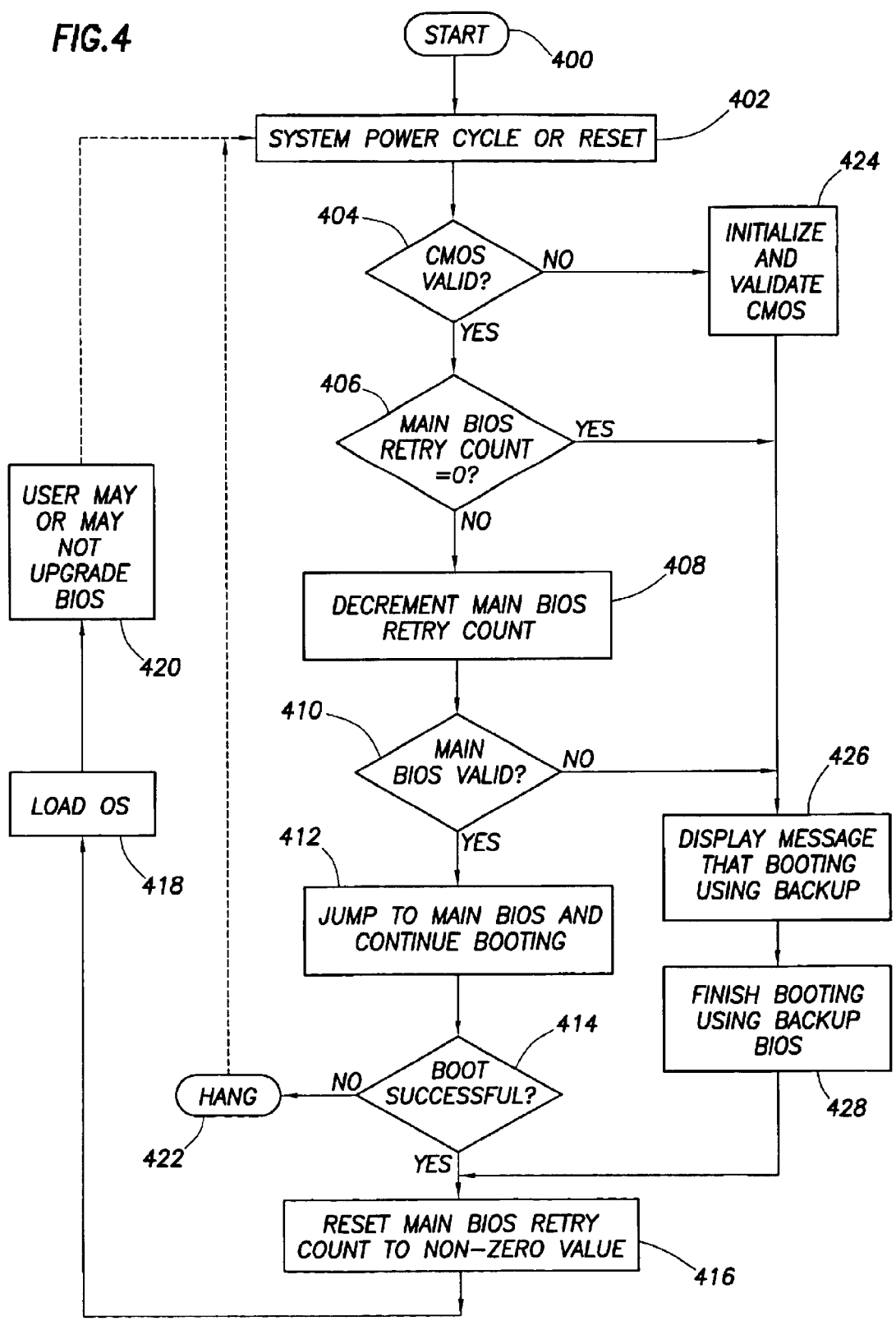
FIG. 4 is a flow-chart of a portion a BIOS initialization method used to initialize the computer system in FIG. 1, in accordance with an embodiment of the invention.

FIG. 4 shows a flow chart of a process related to choosing the BIOS used to boot the computer system S of FIG. 1, in accordance with an embodiment of the invention. The code is stored in the Flash ROM 278, although in other embodiments, it could be stored in other auxiliary memory locations. The processor 16 executes the code that controls the process in FIG. 4. At block 400, the start of the process, before a system power cycle (cold boot) or a reset (warm reboot) at block 402, among other parameters already set by code in the Flash ROM 278 (or 378) in a physical address (es) outside the blocks used for the backup BIOS (i.e., outside the blocks 202 or 302A–302N) and the main BIOS (i.e., outside the blocks 204 or 304A–304N), is a count parameter termed "main BIOS retry count." The count is stored in the CMOS, but it could be stored in the BIOS image of the flashed main BIOS or elsewhere. For example, the count could be stored in any non-volatile storage, such as a hard disk.

The initial value of the count can be set to a predetermined non-zero default value at the factory. For example, the count can be set to 3 in one nonlimiting embodiment, but could be set to another non-zero value in other embodiments depending on design, as will be appreciated by those skilled in the art. Further, the initial value of the count could be set in the backup BIOS code, for example, as part of an object. Only if the CMOS is corrupted would it be necessary to go back and set the initial value of the count. The very first time the computer system S is powered on, the backup BIOS will set the initial count value as part of the process of initializing the CMOS, and the computer system S will be booted using the backup BIOS.

Upon system power cycle or reset at block 402, which requires user intervention, the computer S is turned on or reset, and the booting of the computer system S begins. The process next determines at block 404 if CMOS values are valid, as will be appreciated by those skilled in the art. The CMOS values contain computer system information usually stored in battery-backed memory, which is retained from boot-to-boot of the computer system S. If the CMOS is valid, at block 406, it is determined if the main BIOS retry count has a zero value. If the count has a non-zero value, which it should for normal booting of the computer system S using the main BIOS, then the count is decremented at block 408. The process then determines if the main BIOS is valid at block 410. The backup BIOS validates the contents of the main BIOS via methods that can include any or a combination of the following: checksums, CRCs (Cyclic Redundancy Checks), system board IDs, digital signatures, and the like. If the main BIOS is valid at block 410, a jump is made from an exit point at the end of the BIOS validation code in the backup BIOS to an entry point in the main BIOS to continue booting at block 412 using the main BIOS. More specifically, in this non-limiting embodiment, a jump is made first to code in the backup BIOS that checks and validates the contents of CMOS and the main BIOS. If these are valid, there will be a jump to the main BIOS for completion of booting at block 412. Control thus shifts from the backup BIOS to the main BIOS. At block 414, if the boot is then successful using the main BIOS, at block 416 the count is reset to the non-zero value and the operating system (OS) is loaded at block 418. The user then can use the computer system S. At some point while operating the computer system S, the user may or may not update or upgrade the main BIOS of the computer system S at block 420 before the computer system S is power cycled or reset again at block 402. The operation of the backup and the main BIOS so far described represents the expected normal booting operation and loading of the OS.

Referring again to block 412, the physical address within the Flash ROM 278 (or 378) from which the jump within the backup BIOS to the validation code occurs typically is termed the "reset vector." Once validation occurs, a jump is made to the main BIOS. The reset vector moniker originated with the 8086 family of processors by Intel Corporation. For example, if the top physical address of the Flash ROM 278 (or 378) is FFFFFFFF hexadecimal, the reset vector typically uses at least the physical address FFFFFFF0 hexadecimal as the jump address. In other embodiments, the address used could be another address depending on the design of the Flash ROM 278 (or 378) and/or the processor 16. In one embodiment, assuming a top down architecture, the backup BIOS starts at physical address FFFE0000 hexadecimal and the main BIOS starts at physical address FFFC0000 hexadecimal, although in other embodiments, other such physical addresses are possible. Also, in other embodiments, instead of a top down architecture, the Flash ROM 278 (or 378) can be a bottom up architecture like the description given above for the Flash ROM 178.

Returning to block 414 in FIG. 4, if instead booting is unsuccessful using the main BIOS, the computer system S "hangs" at block 422 without properly booting. Then, user intervention is required, as indicated by the dotted line in FIG. 4, to cause a system power cycle or reset again at block 402. If power cycle or reset does occur, then the procedure is repeated, as outlined above. As can be seen in FIG. 4, if booting is unsuccessful a number of times at block 414 and the predetermined count value is decremented the number of times until it reaches the zero value at block 406, then a prompt or message is displayed to the user at block 426 that booting is continuing using the backup BIOS. The prompt or message can appear, for example, on a video display, such as display 26 in FIG. 1. This will occur if booting remains unsuccessful at block 406 for the predetermined number of times corresponding to the main BIOS retry count default value even though the main BIOS could be valid at block 410. Booting thus is finished using the backup BIOS at block 428, the count is reset at block 416, the OS then is loaded at block 418, and so on. This pathway from block 406 represents an ability to recover and fully boot the computer system S using the backup BIOS until control can be transferred to the operating system, and will be used every time the computer system S is rebooted until booting is successful at block 414.

Returning to block 404, if the CMOS is invalid, then the process instead proceeds to initialize to default values of the configuration and validate all the CMOS settings at block 424 using, for example, a checksum operation or the like, i.e., using an operation that will accomplish the same purpose, as will be appreciated by those skilled in the art. A CMOS bit can be set to allow the process to proceed from block 424 to the display prompt or message of block 426. This pathway can be taken for whatever reason the CMOS is invalid, and would be taken, for example, for reasons other than a computer virus or the backup BIOS not being compatible with the hardware of the computer system S. This pathway allows booting to occur using the backup BIOS through blocks 424, 426, and so on. An additional prompt or message could be displayed to the user that the CMOS values have been initialized and validated.

Returning to block 410, if the main BIOS is determined to be invalid, then the process also takes the pathway that boots the computer system S by using the backup BIOS through blocks 424, 426, and so on. An additional prompt or message could be displayed to the user in this instance to indicate that the main BIOS is invalid. This could occur, for example, if a computer virus corrupted or rendered the main BIOS invalid, in which case, it would be desirable to avoid booting using the main BIOS, and only allowing booting through the protected backup BIOS, as the process provides.

It is to be understood that throughout the process shown in FIG. 4 it is possible for the user to halt the booting process, whether via the main BIOS or the backup BIOS in order to update or upgrade BIOS settings, for example, if new hardware is installed in the computer system S that requires a BIOS setting change. This can be accomplished, for example, by the user pressing a hot key during the booting process, as similarly described above for the Flash ROM 178, as will be appreciated by those skilled in the art.

Thus, according to the invention, in normal booting operation, when BIOS code copies or decompresses ROM data to RAM, shadow RAM, or the like, the source of the data will be the main BIOS if it is valid. Otherwise, the source will be the permanent backup BIOS. Either way, at the end of POST, the computer system S will have successfully completed POST, the active BIOS will be bootable, the count will be reset to the predetermined non-zero value, and the OS will be loaded and in control of the computer system S. The computer system S will be fully operational whether booting occurs from the backup or the main BIOS, not just a minimal number of hardware components.

The foregoing disclosure and description of embodiments are illustrative and explanatory thereof, and various changes in the components, circuit elements, circuit configurations, and signal connections, as well as in the details of the illustrated circuitry and construction and method of operation may be made without departing from the spirit and scope of the invention.

We claim:

1. A method of implementing a hardware independent computer system BIOS recovery, the method comprising:
   executing a backup BIOS to validate a main BIOS;
   if the main BIOS is invalid, initializing the computer system to be fully operational by executing only the backup BIOS; and
   if the main BIOS is valid, initializing the computer system to be fully operational by executing the main BIOS.

2. The method of claim 1, wherein the main BIOS comprises a flashable BIOS.

3. The method of claim 1, wherein the backup BIOS comprises a permanent BIOS.

4. The method of claim 1, further comprising executing code in a Flash ROM up to a certain address, and after validating the main BIOS, executing other code in the main BIOS.

5. The method of claim 1, wherein the backup BIOS is identical to the main BIOS.

6. The method of claim 1, wherein the backup BIOS is a full backup BIOS.

7. The method of claim 1, further comprising storing the main BIOS in a portion of a flash read only memory (Flash ROM).

8. The method of claim 1, further comprising storing the backup BIOS in a non-protected portion of read only memory (ROM).

9. The method of claim 1, further comprising storing the backup BIOS in a single protected sector of a read only memory (ROM).

10. The method of claim 1, further comprising storing the backup BIOS in a plurality of protected sectors of read only memory (ROM).

11. The method of claim 1, further comprising storing the main BIOS in a single flashable sector of a read only memory (ROM).

12. The method of claim 1, further comprising storing the main BIOS in a plurality of flashable sectors of read only memory (ROM).

13. The method of claim 1, wherein if the main BIOS is invalid, continuing execution of the backup BIOS for initializing the computer system until an updated or corrected main BIOS is installed in the computer system.

14. The method of claim 1, wherein if the main BIOS is invalid, displaying a message that the computer system is initializing using the backup BIOS.

15. The method of claim 1, wherein if the computer system hangs after unsuccessfully initializing using the main BIOS, decrementing a count.

16. The method of claim 1, wherein executing a backup BIOS to validate a main BIOS comprises validating the main BIOS using checksums, cyclic redundancy checks, system IDs, or digital signatures.

17. The method of claim 1, further comprising checking a count value to determine if the count has reached a certain number.

18. The method of claim 17, wherein if the count has not reached the certain number, continuing to execute the main BIOS, and wherein if the count has reached the certain number, continuing to execute the backup BIOS.

19. The method of claim 18, wherein the count is reset upon completion of the initialization of the computer system by the main BIOS.

20. A computer system implementing a hardware independent BIOS recovery, comprising:
   non-volatile memory adapted to store a main BIOS and a backup BIOS; and
   a processor coupled through the computer system to the non-volatile memory and adapted first to execute code in the backup BIOS to determine if the main BIOS is valid, then to fully initialize the computer system using the main BIOS if the main BIOS is valid, otherwise to fully initialize the computer system using the backup BIOS if the main BIOS is invalid.

21. The computer system of claim 20, wherein if the main BIOS is invalid, execution of the backup BIOS continues, but if the main BIOS is valid, execution of the main BIOS begins.

22. The computer system of claim 20, wherein the processor executes code for determining a count of retrying the main BIOS that corresponds to the number of times the main BIOS is unsuccessful in initializing the computer system.

23. A non-volatile storage device for implementing a hardware independent BIOS recovery for initializing a computer system, comprising:
   a flashable portion of the non-volatile storage device adapted to store a main BIOS that allows initializing the computer system to be fully operational; and
   a non-flashable portion of the non-volatile storage device adapted to store a backup BIOS that allows initializing the computer system to be fully operational,
   wherein the backup BIOS is executed before execution of the main BIOS, and
   wherein the backup BIOS comprises code adapted to determine if the main BIOS is valid.

24. The non-volatile storage device of claim 23, wherein a flash read only memory (ROM) comprises the flashable portion and the non-flashable portion.

25. The non-volatile storage device of claim 23, wherein the flashable portion and the non-flashable portion each comprise single sectors of the non-volatile storage device, one sector adapted to store the main BIOS and another sector adapted to store the backup BIOS.

26. The non-volatile storage device of claim 23, wherein the flashable portion and the non-flashable portion each comprise a plurality of sectors, one plurality of sectors adapted to store the main BIOS and another plurality of sectors adapted to store the backup BIOS.

27. The non-volatile storage device of claim 23, wherein the non-flashable portion comprises code of the backup BIOS that continues to execute if the main BIOS is invalid.

28. The non-volatile storage device of claim 23, wherein the flashable portion comprises code of the main BIOS that executes if the main BIOS is valid.

29. The non-volatile storage device of claim 23, further comprising a physical address from which control of initialization of the computer system shifts from the backup BIOS to the main BIOS if the main BIOS is valid.

30. The non-volatile storage device of claim 23, wherein the main BIOS is stored at lower physical address within the non-volatile memory than the backup BIOS.

31. A system to support a hardware independent BIOS recovery, the system comprising:
   a non-volatile memory;
   one or more sectors residing in the non-volatile memory; and
   a first BIOS code stored in the one or more sectors, the first BIOS code, when executed, causing the processor to:
      determine whether a second BIOS is valid, and
      responsive to determining whether the second BIOS is valid:
         initialize the system to be filly operational by executing only the first BIOS if the second BIOS is invalid, and
         initialize the system to be fully operational by executing the second BIOS if the second BIOS is valid.

32. The system of claim 31, wherein the first and second BIOS each comprise a full BIOS.

33. The system of claim 31, wherein the non-volatile memory comprises a flash read-only memory (Flash ROM).

34. A system to support a hardware independent BIOS recovery, the system comprising:
   a processor;
   a non-volatile memory coupled to the processor; and
   a first BIOS residing in the non-volatile memory, the first BIOS code, when executed, causing the processor to:
      determine whether a second BIOS is valid, and
      responsive to determining whether the second BIOS is valid:
         initialize the system to be fully operational by executing only the first BIOS if the second BIOS is invalid, and
         initialize the system to be fully operational by executing the second BIOS if the second BIOS is valid.

35. The system of claim 34, wherein the first and second BIOS each comprise a full BIOS.

36. A system to support a hardware independent BIOS recovery, the system comprising:
   a processor;
   a non-volatile memory coupled to the processor, the non-volatile memory containing a writeable portion and a protected portion;
   a full backup BIOS residing in the protected portion of the non-volatile memory, the full backup BIOS comprising code to determine whether the full main BIOS is valid; and
   a full main BIOS residing in the writeable portion of the non-volatile memory.

* * * * *